UNITED STATES PATENT OFFICE.

JULIUS HACKERT, OF BRIDGEPORT, CONNECTICUT.

IMPROVED COMPOSITION METAL.

Specification forming part of Letters Patent No. 42,762, dated May 17, 1864.

*To all whom it may concern:*

Be it known that I, JULIUS HACKERT, of Bridgeport, in the county of Fairfield and State of Connecticut, have invented a new and Improved Metal Composition; and I do hereby declare that the following is a full, clear, and exact description thereof, which will enable those skilled in the art to make and use the same.

This invention consists in a composition made from copper, arsenic, and cream of tartar, to which a very small percentage of silver may be added. The proportion in which I mix these ingredients together is about as follows: copper, one and one-half pound; arsenic, one and one-half pound; cream of tartar, one pound, and, if desired, as much as a five cent piece of silver may be added, in order to increase the whiteness or to take off the reddish scale of the crude composition. The copper, arsenic, and cream of tartar are placed together in a crucible and melted the same as brass or copper. After the composition is in a state of fusion, and when its ingredients are thoroughly mixed together, I cast the same in a suitable form, either in the shape of bars, which can be afterward rolled, or otherwise brought in any desirable shape.

This composition can be rolled or hammered while hot, the same as pure copper, and it can be made harder or softer by changing the percentage of arsenic. If less arsenic is taken, the metal becomes harder. When made without silver and cast in molds the rough casting has a reddish scale; but when filed off and burnished it becomes white and bright like silver. It does not readily oxidize in the open atmosphere, and when it tarnishes it can be easily brightened up. By the addition of a very small percentage of silver the reddish scale of the crude castings disappears, and the composition is still easier brightened and still less liable to tarnish in the open atmosphere than it is when made without silver.

My composition is of great advantage for carriage and harness makers. It can be used for most articles heretofore made of copper and plated, or of brass and burnished. It takes a much brighter polish than German silver, and it is not liable to become tarnished any more than plated articles.

I claim as new and desire to secure by Letters Patent—

The within-described alloy or composition metal prepared from the material and substantially in the manner set forth.

JULIUS HACKERT.

Witnesses:
 M. M. LIVINGSTON,
 C. L. TOPLIFF.